US011237429B2

(12) United States Patent
Meng et al.

(10) Patent No.: US 11,237,429 B2
(45) Date of Patent: Feb. 1, 2022

(54) LIGHT GUIDING ASSEMBLY AND FABRICATING METHOD THEREOF, BACKLIGHT MODULE AND DISPLAY DEVICE

(71) Applicant: BOE TECHNOLOGY GROUP CO., LTD., Beijing (CN)

(72) Inventors: Xiandong Meng, Beijing (CN); Wei Wang, Beijing (CN); Jifeng Tan, Beijing (CN); Xiaochuan Chen, Beijing (CN); Jian Gao, Beijing (CN); Xianqin Meng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 268 days.

(21) Appl. No.: 16/340,314

(22) PCT Filed: Jul. 26, 2018

(86) PCT No.: PCT/CN2018/097259
§ 371 (c)(1),
(2) Date: Apr. 8, 2019

(87) PCT Pub. No.: WO2019/029380
PCT Pub. Date: Feb. 14, 2019

(65) Prior Publication Data
US 2020/0041841 A1 Feb. 6, 2020

(30) Foreign Application Priority Data
Aug. 11, 2017 (CN) .......................... 201710686311.1

(51) Int. Cl.
G02F 1/13357 (2006.01)
F21V 8/00 (2006.01)
(Continued)

(52) U.S. Cl.
CPC ..... *G02F 1/133606* (2013.01); *G02B 6/0016* (2013.01); *G02B 6/0026* (2013.01);
(Continued)

(58) Field of Classification Search
CPC ......... G02F 1/133606; G02F 1/133603; G02F 1/13362; G02F 1/133607; G02B 6/0026; G02B 6/34
(Continued)

(56) References Cited

U.S. PATENT DOCUMENTS 5,703,667 A    12/1997  Ochiai
2014/0064655 A1*  3/2014  Nguyen ............ G02B 27/0081
                                                            385/11
2015/0268399 A1*  9/2015  Futterer ............ G02B 6/02057
                                                            315/151

FOREIGN PATENT DOCUMENTS

CN    101556356 A    10/2009
CN    102395909 A     3/2012
(Continued)

OTHER PUBLICATIONS

PCT International Search Report, Application No. PCT/CN2018/097259, dated Oct. 11, 2018, 6 pages: with English translation.
(Continued)

*Primary Examiner* — Michael P Mooney
(74) *Attorney, Agent, or Firm* — Armstrong Teasdale LLP

(57) ABSTRACT

A light guiding assembly and a fabricating method, a backlight module, and a display device are provided. The light guiding assembly includes a waveguide layer, and a coupling grating structure including at least two gratings, wherein at least one of the at least two gratings is located inside the waveguide layer, and orthographic projections of the at least two gratings on a surface of the waveguide layer at least partially overlap, the coupling grating structure
(Continued)

being configured such that incident light propagates in the waveguide layer.

14 Claims, 5 Drawing Sheets

(51) Int. Cl.
*G02B 6/34* (2006.01)
*G02F 1/1335* (2006.01)

(52) U.S. Cl.
CPC ............ *G02B 6/0065* (2013.01); *G02B 6/34* (2013.01); *G02F 1/13362* (2013.01); *G02F 1/133603* (2013.01); *G02F 1/133607* (2021.01)

(58) Field of Classification Search
USPC .......................................... 385/37, 50, 901
See application file for complete search history.

(56) References Cited

FOREIGN PATENT DOCUMENTS

| | | |
|---|---|---|
| CN | 206096694 U | 4/2017 |
| CN | 107121824 A | 9/2017 |
| CN | 107238979 A | 10/2017 |
| CN | 107315280 A | 11/2017 |
| CN | 108050439 A | 5/2018 |
| WO | 2013069250 A1 | 5/2013 |

OTHER PUBLICATIONS

PCT Written Opinion, Application No. PCT/CN2018/097259, dated Oct. 11, 2018, 9 pages.: with English translation of relevant part.
China First Office Action, Application No. 201710686311.1, dated Sep. 4, 2019, 19 pps.: with English translation.

\* cited by examiner

LIGHT GUIDING ASSEMBLY AND FABRICATING METHOD THEREOF, BACKLIGHT MODULE AND DISPLAY DEVICE

CROSS REFERENCE TO RELATED APPLICATIONS

This patent application is a National Stage Entry of PCT/CN2018/097259 filed on Jul. 26, 2018, which claims the benefit and priority of Chinese Patent Application No. 201710686311.1 filed on Aug. 11, 2017, the disclosures of which are incorporated by reference herein in their entirety as part of the present application.

BACKGROUND

The present disclosure relates to the field of display, and in particular, to a light guiding assembly and a fabricating method thereof, a backlight module, and a display device.

With the continuous development of display technology and semiconductor technology, display devices are becoming more multifunctional, lighter and thinner to meet users' needs. A liquid crystal display (LCD) device is a kind of display device which is currently widely used. The color display is achieved by allowing liquid crystal molecules to deflect under the action of an electric field to change the transmission of backlight, and cooperating with an optical filter and other structures. A backlight module provides even backlight for the liquid crystal display device, and currently employs a light emitting diode (LED) as a light source. According to different positions where the LEDs are located, backlight modules mainly include edge-type backlight modules and bottom-type backlight modules.

BRIEF DESCRIPTION

Embodiments of the present disclosure provide a light guiding assembly and a fabricating method thereof, a backlight module, and a display device.

An aspect of the present disclosure provides a light guiding assembly. According to an embodiment of the present disclosure, the light guiding assembly includes a waveguide layer, and a coupling grating structure including at least two gratings. At least one of the at least two gratings is located inside the waveguide layer. Orthographic projections of the at least two gratings on a surface of the waveguide layer at least partially overlap. The coupling grating structure is configured such that incident light propagates in the waveguide layer.

According to an embodiment of the present disclosure, the waveguide layer includes a first waveguide sub-layer, a second waveguide sub-layer, and a third waveguide sub-layer that are arranged in a stack, and the coupling grating structure includes a first grating and a second grating. The first grating is located on a side of the first waveguide sub-layer away from the second waveguide sub-layer, and the second waveguide sub-layer has a cavity structure configured to receive the second grating.

According to an embodiment of the present disclosure, the first grating is configured to diffract the incident light to form first diffracted light such that at least one portion of diffraction orders of the first diffracted light satisfies total reflection conditions in the waveguide layer, and the second grating is configured to diffract light from the first grating to form second diffracted light such that at least one portion of diffraction orders of the second diffracted light satisfies total reflection conditions in the waveguide layer.

According to an embodiment of the present disclosure, the at least one portion of the diffraction orders of the first diffracted light and the second diffracted light include +/−2nd order and above.

According to an embodiment of the present disclosure, energy of the 0th order and the +/−2nd order of the first diffracted light is greater than energy of other diffraction orders.

According to an embodiment of the present disclosure, energy of the +/−2nd order of the second diffracted light is greater than energy of other diffraction orders.

According to an embodiment of the present disclosure, the first grating and the second grating include a plurality of annular grid lines that are evenly spaced and have equal widths and equal thicknesses.

According to an embodiment of the present disclosure, the first grating and the second grating include a plurality of sub-gratings arranged concentrically. Each sub-grating includes a plurality of annular grid lines that are evenly spaced and have equal widths and equal thicknesses. Different sub-gratings have different grating periods.

According to an embodiment of the present disclosure, the coupling grating structure has a refractive index greater than a refractive index of the waveguide layer.

According to an embodiment of the present disclosure, the first waveguide sub-layer, the second waveguide sub-layer, and the third waveguide sub-layer have the same refractive index.

According to an embodiment of the present disclosure, the incident light is divided into first polarized light polarized in a first direction and second polarized light polarized in a second direction perpendicular to the first direction. The first grating is configured to have coupling efficiency for the first polarized light higher than that for the second polarized light, and the second grating is configured to have coupling efficiency for the second polarized light higher than that for the first polarized light.

According to an embodiment of the present disclosure, the light guiding assembly further includes a light guiding dot layer arranged on at least one of a light entering side and a light exiting side of the waveguide layer.

In another aspect of the disclosure, the present disclosure provides a backlight module. According to an embodiment of the present disclosure, the backlight module includes a light source and any of light guiding assemblies described above. The light guiding assembly is arranged in a light exiting direction of the light source. The coupling grating structure is in one-to-one correspondence with the light source.

According to an embodiment of the present disclosure, the backlight module further includes at least one of the following structures: a reflective sheet, the light source being arranged between the reflective sheet and the light guiding assembly, or the light guiding assembly being arranged between the light source and the reflective sheet, a fluorescent film layer arranged in a light exiting direction of the light guiding assembly, a diffusing sheet arranged in the light exiting direction of the light guiding assembly, and a prism film arranged in the light exiting direction of the light guiding assembly.

Another aspect of the present disclosure provides a display device. According to an embodiment of the present disclosure, the display device includes any of backlight modules described above.

In still another aspect of the disclosure, the present disclosure provides a method of fabricating a light guiding assembly. According to an embodiment of the present disclosure, the method includes forming a waveguide layer, disposing a coupling grating structure including at least two gratings. At least one of the at least two gratings is located inside the waveguide layer. Orthographic projections of the at least two gratings on a surface of the waveguide layer at least partially overlap. The coupling grating structure is configured such that incident light propagates in the waveguide layer.

According to some embodiments of the present disclosure, forming the waveguide layer and disposing the coupling grating structure include disposing a first waveguide sub-layer, disposing a first grating on a side of the first waveguide sub-layer, disposing a second waveguide sub-layer on a surface of the first waveguide sub-layer away from the first grating, forming a cavity structure at a position of the second waveguide sub-layer opposite to the first grating, providing a second grating in the cavity structure, and disposing a third waveguide sub-layer on a side of the second waveguide sub-layer away from the first waveguide sub-layer.

According to further embodiments of the present disclosure, forming the waveguide layer and disposing the coupling grating structure include disposing a first waveguide sub-layer, disposing a first grating on a side of the first waveguide sub-layer, disposing a second grating on a side of the first waveguide sub-layer away from the first grating, disposing a second waveguide sub-layer on a surface of the first waveguide sub-layer away from the first grating, the second waveguide sub-layer having a cavity structure configured to receive the second grating, and disposing a third waveguide sub-layer on a side of the second waveguide sub-layer away from the first waveguide sub-layer.

Further aspects and scope of adaptations will become apparent from the description provided herein. It should be understood that various aspects of the present application may be implemented separately or in combination with one or more other aspects. It should also be understood that the description and specific embodiments herein are intended to be illustrative only and are not intended to limit the scope of this application.

BRIEF DESCRIPTION OF THE DRAWINGS

The drawings described herein are for the purpose of illustrating only selected embodiments, not all possible embodiments, and are not intended to limit the scope of this application, wherein.

DETAILED DESCRIPTION

Figure 1:
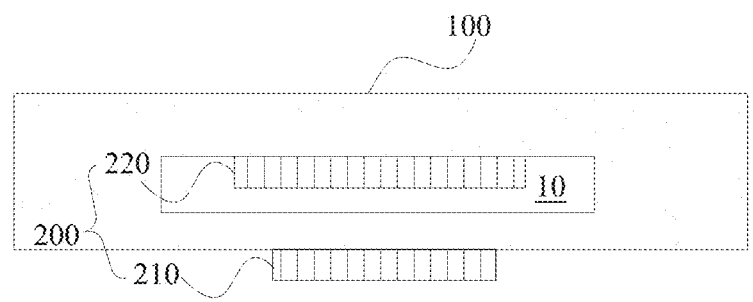
FIG. 1 shows a schematic structural view of a light guiding assembly according to an embodiment of the present disclosure.

Embodiments of the present disclosure are described in detail below, and examples of the embodiments are illustrated in the accompanying drawings, wherein the same or similar reference numerals indicate the same or similar elements or elements having the same or similar functions. The embodiments described below with reference to the accompanying drawings are exemplary for the purpose of illustration of the present disclosure only, and are not to be construed as limiting.

The present disclosure is based on the discovery and recognition of the following facts and problems by the inventors.

The inventors found that current backlight modules, especially bottom-type backlight modules, generally have problems such as excessive thickness and poor light coupling efficiency of the light guiding plate. Due to these problems, on the one hand, it is difficult to make display devices thin and light; on the other hand, since the light coupling efficiency is poor, the brightness of backlight needs to be greatly increased if a better display effect is required, thereby causing the display device to consume excessive power. The inventors have conducted in-depth research and a large number of experiments and found that this is mainly due to the unreasonable structural design of the existing light guiding assembly such as the light guiding plate. The existing LCD, especially in bottom-type backlight structure of large-size LCD, typically has multiple LEDs. However, the light guiding plate usually has only a light guiding function, but it is impossible to achieve mixing of light emitted by a plurality of LEDs. As a result, a certain longitudinal light mixing distance (for example, 2 to 22 mm) is required between adjacent LED light sources in the backlight structure, and the horizontal spacing between the LEDs is very small, so the number of LEDs to be used is very large, about tens of thousands, and thus the existing LED backlight technology has the problems that the overall thickness of the backlight structure is too large and the backlight cost is too high. In addition, the light emitted by the light source undergoes multiple reflections in the backlight module during the propagation process, and thus the optical energy loss is very serious. Although the reflectivity of the inner wall of the backlight cavity is as high as 95%, at least 25% of the light energy is still lost during the reflection process in the backlight cavity. In order to improve the utilization rate of the backlight, although the light energy utilization efficiency of the light guiding plate may be improved by adding a component, such as a nano-grating, the nano-grating layer used usually has a structure of non-equal line width and non-equal height, and thus the machining processes are cumbersome and costly.

In an aspect of the disclosure, a light guiding assembly is provided. Referring to FIG. 1, the light guiding assembly includes a waveguide layer 100 and a coupling grating structure 200. According to an embodiment of the present disclosure, the coupling grating structure 200 includes at least two gratings (210 and 220 as shown). At least one of the at least two gratings is arranged inside the waveguide layer 100, and the orthographic projections of the at least two gratings on a surface (light exiting surface) of the waveguide layer at least partially overlap. In an embodiment of the present disclosure, the coupling grating structure 200 is configured such that incident light propagates in the waveguide layer.

In the embodiment of the present disclosure, the coupling grating structure including at least two gratings may couple incident light into the waveguide layer with higher coupling efficiency to cause incident light to propagate in the waveguide layer. In addition, the light guiding assembly provided according to the embodiment of the present disclosure is advantageous in reducing the thickness of the backlight module, simplifying the fabricating process, and the like.

In some embodiments of the present disclosure, the coupling grating structure 200 may include a plurality of gratings oppositely arranged, for example, three, four, or more.

Figure 3:
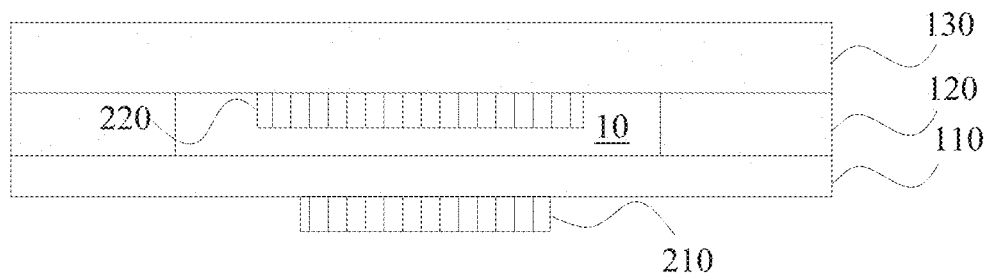
FIG. 3 shows a schematic structural view of a light guiding assembly according to an embodiment of the present disclosure.

According to an exemplary embodiment of the present disclosure, referring to FIG. 3, the light guiding assembly may include a first waveguide sub-layer 110, a second waveguide sub-layer 120, and a third waveguide sub-layer 130 that are stacked. The coupling grating structure 200 may include two gratings, namely a first grating 210 and a second grating 220. The first grating 210 is located on a side of the first waveguide sub-layer 110 away from the second waveguide sub-layer 120. The second waveguide sub-layer 120 has a cavity structure 10 configured to receive the second grating 220. The second grating 220 is located in the cavity structure 10. In the exemplary embodiment, the second grating may further couple light that cannot be coupled by the first grating such that more light may be coupled into the waveguide layer to propagate in a total reflection manner in the waveguide layer, thus facilitating to improve the coupling efficiency of light.

Alternatively, the second grating 220 may be located on a side of the third waveguide sub-layer 130 adjacent to the second waveguide sub-layer 120.

In an embodiment of the present disclosure, the specific type of the coupling grating structure (such as the first grating and the second grating) is not particularly limited. The grating described above may be a two-dimensional grating. As an example, the first grating and the second grating may be two-dimensional nano-gratings.

In an exemplary embodiment of the present disclosure, the first grating 210 may be configured to diffract incident light to form first diffracted light such that at least one portion of diffraction orders of the first diffracted light satisfies total reflection conditions in the waveguide layer, and the second grating is configured to further diffract light from the first grating to form second diffracted light such that at least one portion of diffraction orders of the first diffracted light satisfies total reflection conditions in the waveguide layer. By stepwise diffraction of the first grating and the second grating, more light may be coupled into the waveguide layer, thereby improving the diffraction efficiency of the incident light.

In an exemplary embodiment, at least one portion of diffraction orders of the first diffracted light and of the second diffracted light satisfying total reflection conditions in the waveguide layer may include the +/−2nd order and above. It should be noted that, in the embodiment of the present disclosure, "the +/−2nd order" means the second diffraction order on the left and right sides with respect to the center diffraction order (order 0) in the diffraction spectrum diffracted by the grating. By way of example, in the case where the diffraction spectrum includes a plurality of parallel spectral lines, the +2nd order refers to the second diffraction order to the left of the center diffraction order, and the −2nd order refers to the second order to the right of the center diffraction order; in the case where the diffraction spectrum includes a plurality of annular spectral lines, the +/−2nd order actually refers to the diffraction order corresponding to the same diffraction line, that is, the diffraction order corresponding to the second spectral line from the center to the edge. "+/−2nd order and above" may include +/−3rd order, +/−4th order, +/−5th order . . . .

It should also be noted that it is possible that the diffraction orders of the first diffracted light and the second diffracted light satisfying total reflection conditions in the waveguide layer may also include the +/−1st order by configuring reasonable structural parameters of the gratings.

In order to further improve the diffraction efficiency, the energy of the 0th order and the +/−2th order of the first diffracted light and the second diffracted light is greater than the energy of the other diffraction orders. In this way, the 0th order of the first diffracted light may be further diffracted by the second grating, and the +/−2nd order diffracted light having higher energy may be coupled into the waveguide layer.

Hereinafter, the light guiding principle of the light guiding assembly according to an example of the embodiment of the present disclosure will be described in detail by taking the light guiding assembly shown in FIG. 3 as an example and in combination with FIGS. 4 and 5.

Figure 2:
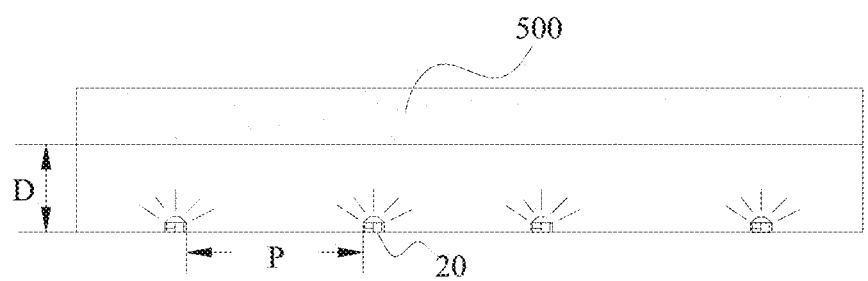
FIG. 2 shows a schematic structural view of a light guiding assembly in the related art.

As described above, with reference to FIG. 2, in the related art, a plurality of light-emitting diodes (LEDs) are generally required in a bottom-type backlight structure of an LCD, particularly a large-sized LCD. In the backlight structure, a certain longitudinal light mixing distance (D as shown in the figure) is required between the light emitting diodes and the light guiding assembly, and a certain horizontal distance is required between adjacent light emitting diodes 20 (P as shown in the figure), and then light is homogenized by the light guiding plate 500. Such an LED backlight technology has problems such as an excessive thickness of the entire backlight structure, an excessive backlight cost, and low coupling efficiency.

Figure 4:
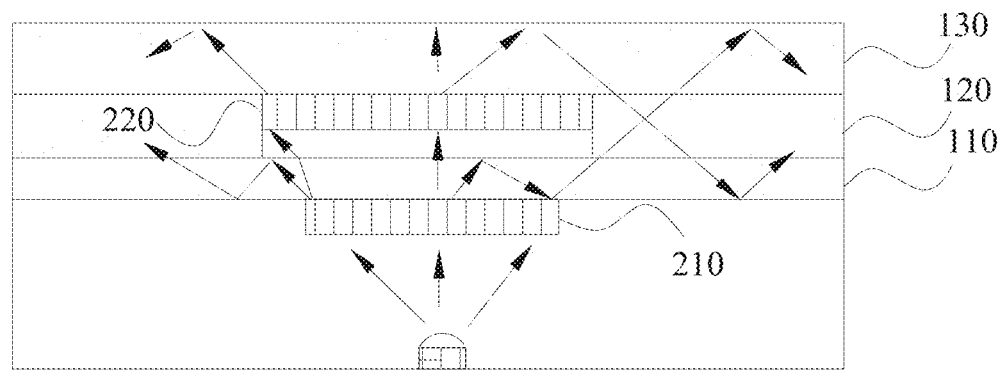
FIG. 4 shows a schematic view of a coupling grating structure of a light guiding assembly to couple light according to an embodiment of the present disclosure.
Figure 5:
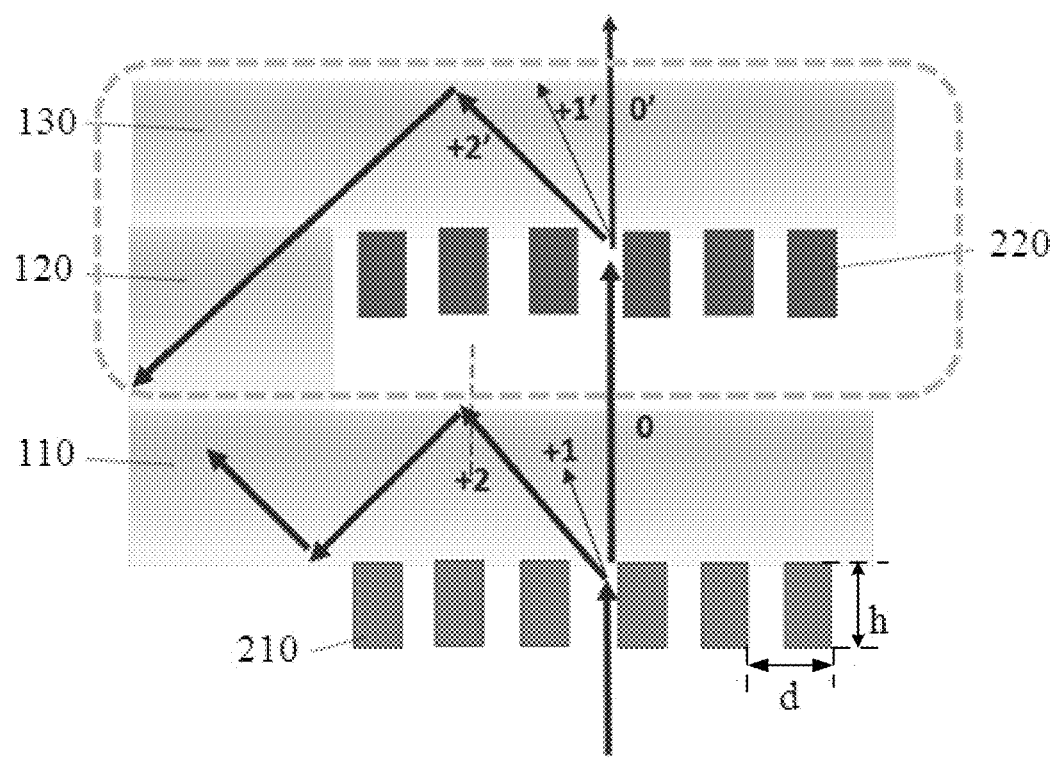
FIG. 5 shows a schematic view of a light guiding assembly coupling +/−2nd order diffracted light according to an embodiment of the present disclosure.

In an embodiment of the present disclosure, referring to FIG. 4 and FIG. 5, a coupling grating structure 200 is disposed in the light guiding assembly, and structural parameters of the first grating 210, for example, the period (d as shown in FIG. 5), thickness (h as shown in FIG. 5) and duty cycle, may be configured such that the energy of the diffracted light obtained after the light emitted from the light source (light emitting diode) passes through the first grating 210 is concentrated at the 0th order and orders at which total reflection may occur in the waveguide layer. That is to say, the energy of the diffracted light having a diffraction spectral order of 0 is higher, and the energy of the diffracted light of diffraction orders (for example, the diffraction spectral order of +/−2nd orders) at which total reflection may occur in the waveguide layer is also higher. As an example, the energy of the diffracted light with the 0th order and of the diffracted light with the +/−2nd order which have been diffracted by the first grating 210 may be at least 80% of the total energy of the diffracted light. With this configuration, the diffracted light with diffraction spectral orders including but not limited to the +/−2nd order may be totally reflected in the waveguide layer (the first waveguide sub-layer 110, the second waveguide sub-layer 120, and the third waveguide sub-layer 130 as shown in FIGS. 3-5) so as to couple this portion of light into the waveguide layer. Light having a diffraction order of 0 is incident on the second grating and is further diffracted by the second grating. Similarly, structural parameters of the second grating 220, such as period, thickness, and duty cycle, may be configured to recouple light (e.g., light of the 0th order) that is not coupled into the waveguide layer by the first grating 210. Specifically, light of the 0th order in the diffracted light by the first grating 210 cannot be totally reflected in the waveguide layer, but is incident on the second grating 220. After being diffracted by the second grating 220, most of this portion of light may be totally reflected within the waveguide layer and thus can be coupled into the waveguide layer. As an example, after passing through the second grating 220, the diffracted light with orders that may be totally reflected (e.g., the diffraction spectral order of +/−2nd) has greater energy than the diffracted light with other diffraction orders. Thus, the coupling efficiency of the light guiding assembly to backlight may be further improved.

Since it is impossible to eliminate zero-order light waves (direct current term, linearly transmitted in a geometric optical direction) in the spectral distribution of a diffraction grating modulated light field, the energy thereof accounts for a relatively large proportion of the energy of the entire diffracted light, so the zero-order light obtained from the incident beam modulated by the coupling grating cannot be coupled (i.e., cannot be transmitted in the waveguide layer in the form of total reflection), resulting in low coupling efficiency. According to an embodiment of the present disclosure, by optimizing the grating structure such that diffraction orders of the diffracted light diffracted by the first grating and satisfying total reflection conditions in the waveguide layer have higher energy, so as to couple this portion of light into the waveguide layer, while light with diffraction orders (for example, the 0th order) incapable of total reflection may be further diffracted by the second grating so that more light is coupled, so the diffraction efficiency may be greatly improved. According to the light guiding assembly of the embodiment of the present disclosure, the light efficiency may be, for example, 80% or more.

In an exemplary embodiment, a period of the grating described above may be determined according to the following formula:

$$n_1 \sin \theta_1 + n_2 \sin \theta_2 = m\lambda/d$$

where $n_1$ is a refractive index of the medium where the incident light is, $n_2$ is a refractive index of the medium where the diffracted light is, $\theta_1$ is an angle of incidence, $\theta_2$ is an angle of diffraction, m is a diffraction order, $\lambda$ is a wavelength, and d is the period. The grating thickness may be determined based on fitting optimization.

The inventors have found that in bottom-type backlight processing, local diming technology may be used to reduce power consumption, improve imaging contrast, and increase the number of grayscales. The main principle of local diming is to divide LCD backlight into a plurality of small blocks and adjust the light and dark contrast of the backlight according to the grayscale of the corresponding liquid crystals display content of respective small blocks during operation. The backlight is required to provide desired brightness when displayed. However, since most of liquid crystal displays are generally constantly bright displays, in the case of poor backlight effect, local diming technology when applied will cause different levels of light leakage and other problems, which may affect the performance of dark details and contrast. The light guiding assembly provided according to the embodiment of the present disclosure may have a sufficiently high light effect due to high backlight coupling efficiency, so that the local diming technology may be better realized, and display defects caused by problems such as light leakage and the like may be avoided.

It should be noted that, in the embodiment of the present disclosure, the number of waveguide sub-layers and the number of gratings included in the coupling grating are not particularly limited as long as the desired coupling efficiency may be achieved by stepwise diffraction through the gratings of the coupling grating structure.

According to an embodiment of the present disclosure, the specific materials forming the waveguide layer and the coupling grating structure are not limited as long as the diffraction efficiency as described above may be obtained. Specifically, the refractive index of the material of the waveguide layer may be greater than the refractive indices of the media above and below the waveguide layer to facilitate the total reflection of the light incident into the waveguide layer. As an example, the refractive index of the waveguide layer may be greater than the refractive index of the medium (e.g., air) in the backlight cavity below the waveguide layer, and greater than the refractive index of the structure above the waveguide layer (e.g., light guiding dots, brightness enhancing film, and prism film). As an example, the waveguide layer and the coupling grating structure may be formed of a material that is transparent and has a relatively high refractive index (greater than the air medium or the medium above and below the light guiding assembly). Each sub-layer of the waveguide layer may be formed of materials having the same refractive index. As an example, the material forming the respective sub-layers of the waveguide layer may have a refractive index of 1.5 to 2, and the material forming the coupling grating structure (for example including the first grating and the second grating) may have a refractive index of 1.5 to 2. The refractive index of the material for forming the coupling grating structure may be greater than the refractive index of the material for forming the waveguide layer. In an exemplary embodiment, the waveguide layer may be formed of a material such as ITO or $Si_3N_4$.

In an exemplary embodiment, the thickness of the first waveguide sub-layer 110, the second waveguide sub-layer 120, and the third waveguide sub-layer 130 may be, for example, 2 μm or even thicker to several tens of micrometers, but is not limited thereto.

Figure 6A:
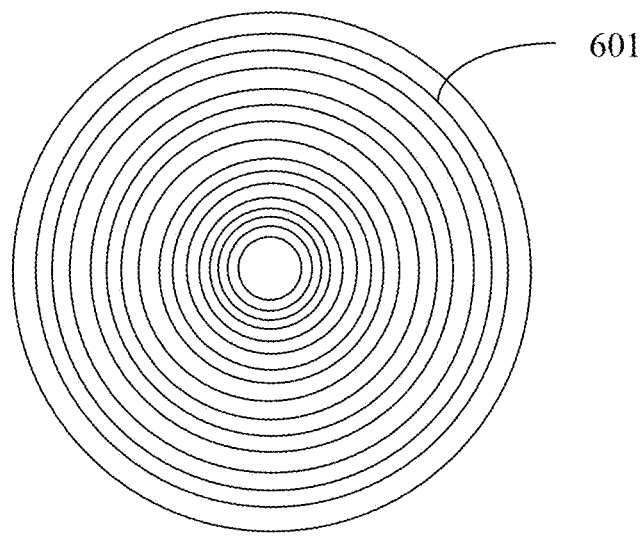
FIG. 6A shows a schematic view of a first grating and a second grating which have evenly spaced annular grid lines according to an embodiment of the present disclosure.

In some embodiments of the present disclosure, in order to reduce production costs, the first grating and the second grating may include a plurality of annular grid lines 601 (as shown in FIG. 6A) that are evenly spaced and have equal widths and equal thicknesses. That is to say, the first grating and the second grating may be circular gratings in which the grid lines are evenly distributed. By configuring the first grating and the second grating to be circular, the shapes of the first grating and the second grating may be adapted to the divergence angle of the light source of the liquid crystal display, thereby enabling better coupling efficiency.

Figure 6B:
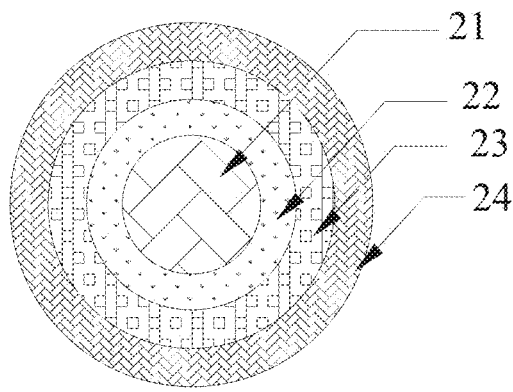
FIG. 6B shows a schematic view of a first grating and a second grating which have a plurality of sub-gratings according to an embodiment of the present disclosure.

Generally, gratings are sensitive to the angle of incidence of light, gratings with the same structure have different diffraction effects on the light of different angle of incidences, and the energy of light emitted by the backlight source (such as a light emitting diode) of a liquid crystal display is usually concentrated at +/−60°. Therefore, in order to improve the diffraction effect, the first grating and the second grating may be designed to include a plurality of sub-gratings 21, 22, 23, 24 arranged concentrically. As shown in FIG. 6B, the first grating and the second grating may include a first sub-grating having a circular cross section and a plurality of second sub-gratings having annular cross sections arranged concentrically. The annular second sub-gratings are arranged around the circular first sub-grating, and the center of the annular second sub-grating coincides with the center of the circular first sub-grating. Each sub-grating may have a plurality of annular grid lines that are evenly spaced and have equal widths and equal thicknesses. Different sub-gratings may have different grating periods. The ranges of incidence angle of incident light corresponding to different second sub-gratings are different.

Figure 7:
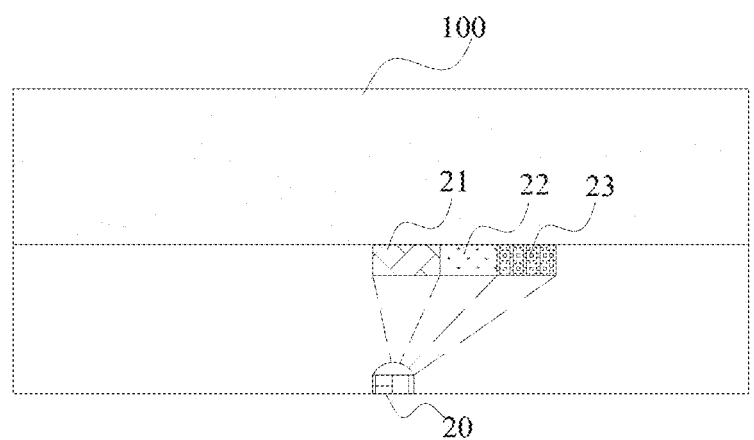
FIG. 7 shows a schematic view of a corresponding relationship between sub-gratings of the first and second gratings of a light guiding assembly and a light source according to an embodiment of the present disclosure.

As an example, as shown in FIG. 7, the projection area of light emitted by the light source may be divided into N parts, each corresponding to a specific range of illumination angles. With respect to a main light ray within each part of the projection area, a sub-coupling grating structure (including the sub-grating of the first grating and the sub-grating of the second grating) may be designed such that the sub-coupling grating structure has high coupling efficiency of light in this specific range of illumination angles.

Moreover, in an embodiment of the present disclosure, the "cavity structure" in the second waveguide sub-layer is used to provide a space for the second grating. In order to enable the second grating to cooperate with the first grating to improve coupling efficiency, the position of the "cavity structure" in the second waveguide sub-layer corresponds to the position of the first grating. The shape and height of the cavity structure are not particularly limited as long as the second grating may be received. As an example, the second waveguide sub-layer may include a plurality of segmented structures spaced apart, and the spacing between the segmented structures may serve as a cavity structure for receiving the second grating. As a further example, the height of the cavity structure may be designed to be less than the thickness of the second waveguide sub-layer. Alternatively, the cavity structure may be a groove structure arranged on a surface of the second waveguide sub-layer adjacent to the first waveguide sub-layer, or may be a groove structure adjacent to the third waveguide sub-layer. As another embodiment, after the second grating is placed in the cavity structure, the cavity structure may also be filled with other materials, and the refractive index of the filling material may be the same as that of at least one of the first waveguide sub-layer, the second waveguide sub-layer, and the third waveguide sub-layer.

The incident light incident into the coupling grating structure may be divided into first polarized light polarized in a first direction and second polarized light polarized in a second direction perpendicular to the first direction. Generally, the grating has different coupling efficiencies for polarized light in different polarization directions of incident light. By way of example, the grating may have a higher coupling efficiency for the first polarized light and a lower coupling efficiency for the second polarized light. Therefore, in some embodiments of the present disclosure, in order to improve the overall coupling efficiency of incident light, the first grating may be configured to have a higher coupling efficiency of the first polarized light than that of the second polarized light, and the second grating is configured to have a higher coupling efficiency of the second polarized light than that of the first polarized light. As an example, in the case where light of the 2nd diffraction order in the diffracted light may be totally reflected in the waveguide layer and the 0th 1st diffraction order cannot be totally reflected, the first grating may be configured such that the first polarization component of the light of the 2nd diffraction order in the first diffracted light is greater than the second polarization component of the light of 2nd diffraction order, and the second grating may be configured such that the second polarization component of the light of the 2nd diffraction order in the second diffracted light formed by diffracting the 0th and 1st orders diffraction light from the first grating is greater than the first polarization component. Thus, both the first polarized light and the second polarized light may have a high coupling efficiency.

Figure 8:
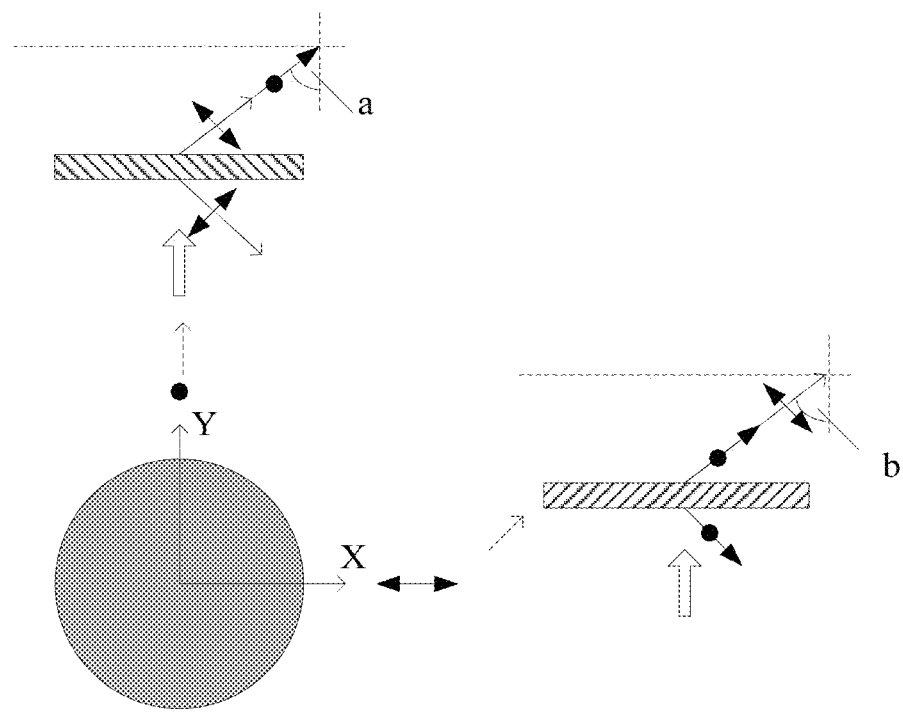
FIG. 8 shows a schematic view of the effect of a coupling grating on the polarization state of incident light according to an embodiment of the present disclosure.

By way of example, referring to FIG. 8, the first direction is perpendicular to the second direction, as shown by the double arrow direction and the solid dot shown in the figure, wherein the double arrow represents a second direction parallel to the paper surface, and the solid dot represents the first direction perpendicular to the paper surface. The structure corresponding to the cross section of the first grating 210 in the Y direction has less reflection of light having a polarization direction coincident with the direction of the solid dot (i.e., the first direction), and therefore has a higher coupling efficiency for the first polarized light polarized in the first direction. The structure corresponding to the cross section of the second grating 220 in the Y direction has less reflection of light having a polarization direction coincident with the direction of the double arrow (i.e., the second direction), and therefore has a higher coupling efficiency for the second polarized light polarized in the second direction. With this configuration, the coupling grating structure has a high coupling efficiency for both the first polarized light and the second polarized light.

According to an embodiment of the present disclosure, since a plurality of light emitting diodes are generally required in the backlight module, the light guiding assembly may further include a plurality of coupling grating structures. The coupling grating structures may be arranged in one-to-one correspondence with the light-emitting diodes, so that the utilization efficiency of backlight may be improved.

According to an embodiment of the present disclosure, the light guiding assembly may further include a light guiding dot layer. The light guiding dot layer may be arranged on the light entering side and/or the light exiting side of the waveguide layer. According to an embodiment of the present disclosure, the light guiding dot layer may be common dots (typically 0.1-1 mm) in a backlight module for an LCD, or may be a specific grating structure (designed for existing LEDs and the light emission situation of the coupling grating structure) to achieve even distribution of backlight. Thus, the light guiding performance of the light guiding assembly may be further improved.

As described above, it is impossible to eliminate zero-order light waves (direct current term, linearly transmitted in a geometric optical direction) in the spectral distribution of a diffraction grating modulated light field. Even if the second grating may further couple the light not coupled by the first grating, there is still some light (such as the 0th order diffraction light) that cannot be coupled, and this part of light may be directly exiting from the waveguide layer to serve as backlight for the liquid crystal display. Therefore, light guiding dots may not be disposed at a position corresponding to the coupling grating structure.

In summary, the light guiding structure according to an embodiment of the present disclosure may have at least the following advantages:

1) Using a double-layer grating structure to couple incident light, the coupling efficiency may be greatly improved, and the light efficiency may reach 80% or above;

2) The thickness of the light guiding assembly may be greatly reduced, thereby further reducing the thickness of the backlight module;

3) The light guiding structure has no requirements on LED spacing, so under the premise of satisfying the overall brightness, the number of LED lamps used may be reduced, thereby reducing the cost; and 4) By optimizing the design of the dot layer structure, dynamic local dimming may be realized under the premise of achieving even light emission to meet technical market demands.

In another aspect of the disclosure, a backlight module is provided. According to an embodiment of the present disclosure, with reference to FIGS. 9 and 10, the backlight module may include a light source 20 and a light guiding assembly as previously described, such as at least one light guiding assembly according to one or more embodiments disclosed in detail above. The light guiding assembly is arranged in a light exiting direction of the light source 20, and the coupling grating structure is in one-to-one correspondence with the light source 20. Thus, for alternative embodiments of the backlight module, reference may be made to the embodiments of the light guiding assembly. The backlight module has all of the advantages of the light guiding assembly previously described. In general, the backlight module has the advantages of high backlight coupling efficiency, slim size, and simple fabricating process.

Figure 9:
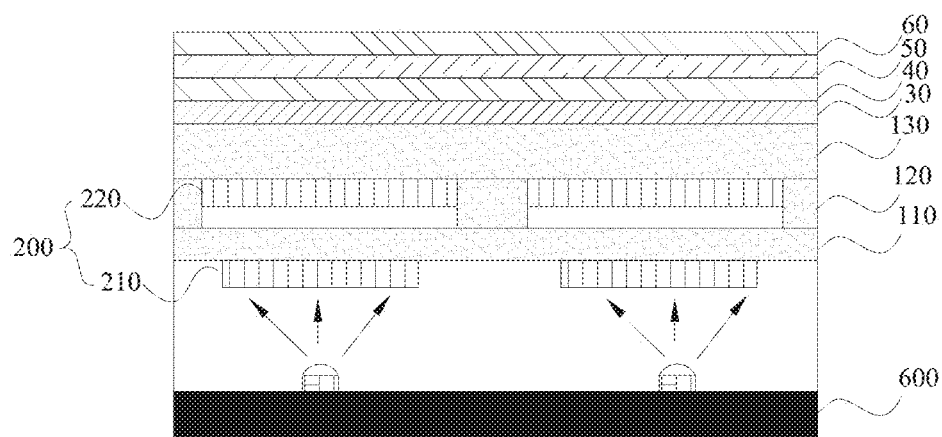
FIG. 9 shows a schematic structural view of a backlight module according to an embodiment of the present disclosure.
Figure 10:
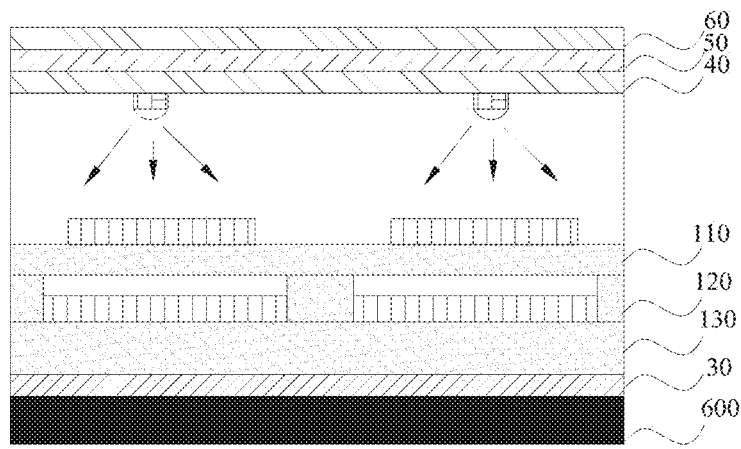
FIG. 10 shows a schematic structural view of a backlight module according to an embodiment of the present disclosure.

According to an embodiment of the present disclosure, the backlight module may further include at least one of the following structures: a reflective sheet 600, a light guiding dot layer 30, a fluorescent film layer 40, a prism film 50, and a diffusion sheet 60. The reflective sheet 600 is configured to reflect light toward the direction of the light guiding assembly. In an exemplary embodiment, a light source may be arranged between the reflective sheet 600 and the light guiding assembly (as shown in FIG. 9). Alternatively, the light guiding assembly may be arranged between the light source and the reflective sheet 600 (as shown in FIG. 10). Thus, the performance of the backlight module may be further improved. The light guiding dot layer 30 may be arranged on a side of the light guiding assembly away from the light source 20. It will be understood by those skilled in the art that at the location where the coupling grating structure is disposed, light guiding dots may not be disposed. The fluorescent film layer 40, the prism film 50, and the diffusion sheet 60 may be sequentially arranged in the light exiting direction of the light guiding assembly. The "light exiting direction" herein refers to the exiting direction of the backlight, that is, the direction in which the backlight is incident on the liquid crystal module from the backlight module.

According to an exemplary embodiment of the present disclosure, the fluorescent film layer 40 may be used to mix light from single color LEDs into white light for emission. As an example, the matching of the LED and the fluorescent film layer 40 may form a blue LED with a YAG layer (B+YAG), a purple LED with an RGB layer (purple+RGB), a blue LED with a quantum dot layer (B+quantum dot layer), and the like.

The diffusion sheet 60 may be composed of a polymer (such as polycarbonate, polymethyl methacrylate, polyethylene terephthalate, etc.) substrate with a high transmittance and scattering particles doped therein (such as titanium dioxide or the like), and may also be a laminated structure of multiple films. The light passing through the diffusion sheet 60 may be scattered by the scattering particles therein, and the observer above the diffusion sheet 60 may not observe the objects below the diffusion sheet 60, such as LED particles, circuit boards, etc., but only perceive the brightness distribution produced by the backlight source on the upper surface of the diffusion sheet 60.

The number of prism films 50 may be one to two layers (also known as brightness enhancement films). According to a specific embodiment of the present disclosure, the prism film 50 may be formed by attaching a prism layer having sharp-angled microprism structures to a substrate layer.

Figure 11:
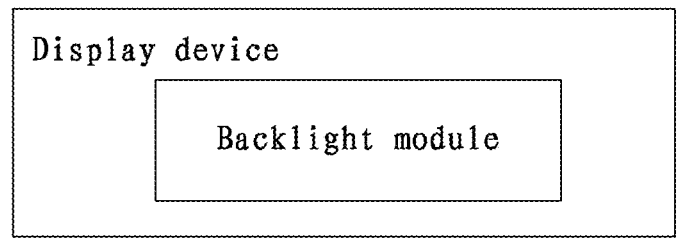
FIG. 11 shows a schematic block diagram of a display device according to an embodiment of the present disclosure.

In another aspect of the disclosure, the present disclosure provides a display device. According to an embodiment of the present disclosure, as shown in FIG. 11, the display device includes the backlight module described above. Thus, the display device has all of the advantages of the backlight module described above. In general, the display device has the advantages of high backlight coupling efficiency, slim size, and simple fabricating process.

Figure 12:
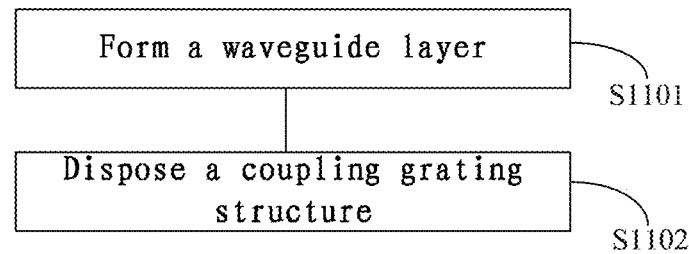
FIG. 12 shows a schematic flowchart of a method of fabricating a light guiding assembly according to an embodiment of the present disclosure.

In another aspect of the disclosure, the present disclosure provides a method of fabricating a light guiding assembly. According to an embodiment of the present disclosure, the light guiding assembly may be the light guiding assembly described above. As shown in FIG. 12, the method may include steps S1101 and S1102.

In step S1101, a waveguide layer is formed. The parameters of the waveguide layer, such as the material, refractive index, have been described in detail above and will not be described herein. Specifically, the waveguide layer may be formed of a layer of material, and a cavity structure is pre-formed at a position where the second grating is required to be arranged. Alternatively, the waveguide layer may include a plurality of waveguide sub-layers, and the cavity structure is pre-formed in the waveguide sub-layer where the second grating is required to be disposed.

In step S1102, a coupling grating structure is disposed. As previously mentioned, the coupling grating structure may include at least two gratings, at least one grating is arranged in the waveguide sub-layer described above, and the orthographic projections of the at least two gratings on the surface of the waveguide layer at least partially overlap. The coupling grating structure enables light after being diffracted by the gratings to propagate in the waveguide layer.

According to an embodiment of the present disclosure, the coupling grating structure may specifically include a first grating and a second grating arranged opposite to each other. The period and thickness of the first grating may firstly be determined according to the wavelength and the angle of incidence of the incident light incident to the first grating, so that the light passing through the first grating is concentrated at the 0th order and the orders enabling total reflection for example the +/−2nd diffraction spectral order. As an example, the energy of the 0th and +/−2nd order diffraction light passing through the first grating 210 may account for at least 80% of the total energy of the diffracted light. Thus, the diffracted light of diffraction spectral order including but not limited to the +/−2 order may be totally reflected in the waveguide layer (including, for example, the first waveguide sub-layer 110, the second waveguide sub-layer 120, and the third waveguide sub-layer 130). By configuring the period and thickness of the second grating 220, the zero-order light passing through the first grating 210 may be re-coupled and used. The zero-order light passing through the first grating 210 is incident on the second grating 220 and is then diffracted by the second grating 220, so most of the light may be totally reflected in the waveguide layer (e.g., concentrated on the diffraction spectral order). Thus, the zero-order diffraction light from the first grating may be reused by employing the second grating, thereby further improving the coupling efficiency of backlight.

As described above, the light guiding assembly fabricated by the method may be the light guiding assembly described above. Therefore, according to a specific embodiment of the present disclosure, the method may specifically include the following steps: forming the first waveguide sub-layer, disposing the first grating on a side of the first waveguide sub-layer, forming the second waveguide sub-layer, forming a cavity structure at a position of the second waveguide sub-layer corresponding to the first grating, disposing the second grating in the cavity structure, disposing the second waveguide sub-layer and the second grating at a side of the first waveguide sub-layer away from the first grating layer, the second grating being arranged close to the first grating, and disposing the third waveguide sub-layer on a side of the second waveguide sub-layer away from the first waveguide sub-layer. Thus, the arrangement of the above structure may be easily realized, and the fabricated light guiding assembly may improve the utilization efficiency of the backlight.

In an alternative embodiment, the first grating and the second grating may be respectively arranged on both sides of the first waveguide sub-layer, and the first grating and the second grating are arranged opposite to each other, subsequently, the cavity structure is formed in the formed second waveguide sub-layer such that the position of the cavity structure corresponds to the position of the second grating, and then the second waveguide sub-layer having the cavity structure is placed on a side of the first waveguide sub-layer having the second grating such that the second grating is received in the cavity structure, finally, the third waveguide sub-layer is disposed on a side of the second waveguide sub-layer away from the first waveguide sub-layer.

In this method, the number of specific sub-layers included in the waveguide layer is not limited as long as the above-described total reflection may be satisfied and the zero-order light may be re-coupled and utilized. As an example, in the case where the thickness of the second waveguide sub-layer is sufficient and the height of the cavity structure is less than the thickness of the second waveguide sub-layer, the third waveguide sub-layer may not be disposed, and the remaining of the second waveguide sub-layer above the second grating may be utilized to totally reflect the diffracted light.

The present disclosure is described by the following specific examples, and those of ordinary skill in the art may appreciate that the following specific embodiments are for illustrative purposes only and do not limit the scope of the present disclosure in any way. Further, in the following embodiments, the materials and equipment employed are commercially available unless otherwise specified. If specific processing conditions and processing methods are not explicitly described in the following embodiments, conditions, and methods well known in the art may be used for processing.

Taking the grating structure including a circular sub-grating and an annular sub-grating as an example, the light exiting efficiency of the sub-grating structure with an angle of incidence of 0 degrees (vertical light incidence) is simulated. Referring to FIG. 5, the first waveguide sub-layer, the second waveguide sub-layer, and the third waveguide sub-layer have a refractive index of 1.5, the first grating and second grating have a refractive index of 2.0, and the air has a refractive index of 1.0. The sub-grating period d is 0.9 µm, the thickness h is 0.5 µm, and the duty cycle is 0.5. The test results are listed in Table 1:

TABLE 1

| Diffraction Order | Angle/degree | Efficiency/% |
| --- | --- | --- |
| I | 0 | 100 |
| T − 2 | −51.058 | 25.239 |
| T − 1 | −22.885 | 1.1793 |
| T − 0 | 0 | 40.091 |
| T + 1 | 22.885 | 1.1793 |
| T + 2 | 51.058 | 25.239 |
| R − 1 | 36.236 | 2.2386 |
| R0 | 0 | 2.5965 |
| R + 1 | −36.236 | 2.2386 |

As may be seen from Table 1, the overall diffraction efficiency of the grating includes the diffraction efficiency of the 0th order light and the +/−2nd order light, and is about 94%. The diffraction efficiency of the +/−2nd order light is about 54%, and the remaining energy of the diffracted light is substantially concentrated on the zero order. The 0th order is the direct current term of the original light, without changing the direction with respect to the original incident light and with weakened energy. Due to the reverse relationship between the energy of the zero-order of the diffracted light and the energy of the +/−1st order, the specific weight of the energy at the +/−1st order may be sufficiently reduced only by increasing the energy of the 0th order light, thereby reducing the loss of the coupled light.

When the refractive index of the waveguide layer is 1.5 and the refractive index of air is 1.0, the critical angle at which total reflection occurs in the waveguide layer is about 41°, while the angle of the +/−2-order light after diffraction by the grating is about 51°, which is greater than the critical angle of total reflection of the waveguide layer. The above design may allow most of the light to be totally reflected in the waveguide layer or secondarily coupled and used by the subsequent grating structure (such as the second grating).

In the description of the present disclosure, the orientation or positional relationship indicted the term "upper", "lower" or the like is based on the orientation or positional relationship shown in the drawings, and is merely for the convenience of describing the present disclosure and does not require that the disclosure must be constructed and operated in a particular orientation, are therefore cannot to be construed as limiting the disclosure.

In the description of the present specification, the description referring to the term "an embodiment", "another embodiment" or the like means that the specific features, structures, materials, or characteristics described in connection with the embodiment are included in at least one embodiment of the present disclosure. In the present specification, the schematic expression of the above terms is not necessarily directed to the same embodiment or example. Furthermore, the specific features, structures, materials, or characteristics described may be combined in a suitable manner in any one or more embodiments or examples. In addition, various embodiments or examples described in the specification and features of various embodiments or examples may be incorporated and combined without contradiction. In addition, it should be noted that in the present specification, the terms "first" and "second" are used for descriptive purposes only, and are not to be construed as indicating or implying a relative importance or implicitly indicating the number of technical features indicated.

While the embodiments of the present disclosure have been shown and described above, it is understood that the foregoing embodiments are illustrative and are not to be construed as limiting the scope of the disclosure. Within the scope of the present disclosure, a person of ordinary skill in the art may change, modify, replace, and vary the above-mentioned embodiments.

What is claimed is:

1. A light guiding assembly, comprising:
    a waveguide layer; and
    a coupling grating structure comprising at least two gratings, wherein at least one of the at least two gratings is located inside the waveguide layer, and orthographic projections of the at least two gratings on a surface of the waveguide layer at least partially overlap,
    wherein the coupling grating structure is configured such that incident light propagates in the waveguide layer,
    wherein the waveguide layer comprises a first waveguide sub-layer, a second waveguide sub-layer, and a third waveguide sub-layer that are arranged in a stack, and the coupling grating structure comprises a first grating and a second grating,
    wherein the first grating is located on a side of the first waveguide sub-layer away from the second waveguide sub-layer,
    wherein the second waveguide sub-layer has a cavity structure configured to receive the second grating,
    wherein the first grating is configured to diffract the incident light to form first diffracted light such that at least one portion of diffraction orders of the first diffracted light satisfies total reflection conditions in the waveguide layer, and the second grating is configured to diffract light from the first grating to form second diffracted light such that at least one portion of diffraction orders of the second diffracted light satisfies total reflection conditions in the waveguide layer, and
    wherein the at least one portion of the diffraction orders of the first diffracted light and the second diffracted light comprise +/−2nd order and above.

2. The light guiding assembly according to claim 1, wherein energy of the 0th and +/−2nd orders of the first diffracted light is greater than energy of other diffraction orders.

3. The light guiding assembly according to claim 1, wherein energy of the +/−2nd order of the second diffracted light is greater than energy of other diffraction orders.

4. The light guiding assembly according to claim 1, wherein the first grating and the second grating comprise a plurality of annular grid lines that are evenly spaced and have equal widths and equal thicknesses.

5. The light guiding assembly according to claim 1, wherein the first grating and the second grating comprise a plurality of sub-gratings arranged concentrically, each sub-grating comprising a plurality of annular grid lines that are evenly spaced and have equal widths and equal thicknesses, different sub-gratings having different grating periods.

6. The light guiding assembly according to claim 1, wherein the coupling grating structure has a refractive index greater than a refractive index of the waveguide layer.

7. The light guiding assembly according to claim 1, wherein the first waveguide sub-layer, the second waveguide sub-layer, and the third waveguide sub-layer have the same refractive index.

8. The light guiding assembly according to claim 1, wherein the incident light is divided into first polarized light polarized in a first direction and second polarized light polarized in a second direction perpendicular to the first direction, wherein the first grating is configured to have a coupling efficiency for the first polarized light higher than that for the second polarized light, and wherein the second grating is configured to have a coupling efficiency for the second polarized lights higher than that for the first polarized light.

9. The light guiding assembly according to claim 1, further comprising:
    a light guiding dot layer arranged on at least one of a light entering side and a light exiting side of the waveguide layer.

10. A backlight module comprising:
    a light source; and
    the light guiding assembly according to claim 1, which is arranged in a light exiting direction of the light source, the coupling grating structure being in one-to-one correspondence with the light source.

11. The backlight module according to claim 10, further comprising at least one of the following structures:
    a reflective sheet, wherein the light source is arranged between the reflective sheet and the light guiding assembly, or wherein the light guiding assembly is arranged between the light source and the reflective sheet;
    a fluorescent film layer arranged in a light exiting direction of the light guiding assembly;
    a diffusion sheet arranged in the light exiting direction of the light guiding assembly; and
    a prism film arranged in the light exiting direction of the light guiding assembly.

12. A display device comprising the backlight module according to claim 10 and a display panel.

13. A method of manufacturing a light guiding assembly, comprising:
    forming a waveguide layer;
    disposing a coupling grating structure, the coupling grating structure comprising at least two gratings, wherein at least one of the at least two gratings is located inside the waveguide layer, and orthographic projections of the at least two gratings on a surface of the waveguide layer at least partially overlap,
    the coupling grating structure being configured such that incident light propagates in the waveguide layer,
    wherein forming the waveguide layer and disposing the coupling grating structure comprise:
    disposing a first waveguide sub-layer;
    disposing a first grating on a side of the first waveguide sub-layer;
    disposing a second waveguide sub-layer on a surface of the first waveguide sub-layer away from the first grating;
    forming a cavity structure at a position of the second waveguide sub-layer opposite to the first grating;
    disposing a second grating in the cavity structure; and
    disposing a third waveguide sub-layer on a side of the second waveguide sub-layer away from the first waveguide sub-layer,
    wherein the first grating is configured to diffract the incident light to form first diffracted light such that at least one portion of diffraction orders of the first diffracted light satisfies total reflection conditions in the waveguide layer, and the second grating is configured to diffract light from the first grating to form second diffracted light such that at least one portion of diffraction orders of the second diffracted light satisfies total reflection conditions in the waveguide layer, and wherein the at least one portion of the diffraction orders of the first diffracted light and the second diffracted light comprise +/−2nd order and above.

14. A method of manufacturing a light guiding assembly, comprising:

forming a waveguide layer;

disposing a coupling grating structure, the coupling grating structure comprising at least two gratings, wherein at least one of the at least two gratings is located inside the waveguide layer, and orthographic projections of the at least two gratings on a surface of the waveguide layer at least partially overlap, the coupling grating structure being configured such that incident light propagates in the waveguide layer, wherein forming the waveguide layer and disposing the coupling grating structure comprise:

disposing a first waveguide sub-layer;

disposing a first grating on a side of the first waveguide sub-layer;

disposing a second grating on a side of the first waveguide sub-layer away from the first grating;

disposing a second waveguide sub-layer on a surface of the first waveguide sub-layer away from the first grating, the second waveguide sub-layer having a cavity structure configured to receive the second grating; and disposing a third waveguide sub-layer on a side of the second waveguide sub-layer away from the first waveguide sub-layer, wherein the first grating is configured to diffract the incident light to form first diffracted light such that at least one portion of diffraction orders of the first diffracted light satisfies total reflection conditions in the waveguide layer, and the second grating is configured to diffract light from the first grating to form second diffracted light such that at least one portion of diffraction orders of the second diffracted light satisfies total reflection conditions in the waveguide layer, and wherein the at least one portion of the diffraction orders of the first diffracted light and the second diffracted light comprise +/−2nd order and above.

* * * * *